United States Patent
Perkins et al.

(10) Patent No.: US 12,101,327 B2
(45) Date of Patent: Sep. 24, 2024

(54) GLOBAL APPROACH FOR MULTIFACTOR AUTHENTICATION INCORPORATING USER AND ENTERPRISE PREFERENCES

(71) Applicant: Stardust Technologies, Inc., Franktown, CO (US)

(72) Inventors: Edward A. Perkins, Franktown, CO (US); Michael K. Welter, Parker, CO (US); Michael A. Scata, Boulder, CO (US)

(73) Assignee: STARDUST TECHNOLOGIES, INC., Franktown, CO (US)

( * ) Notice: Subject to any disclaimer, the term of this patent is extended or adjusted under 35 U.S.C. 154(b) by 510 days.

(21) Appl. No.: 17/445,224

(22) Filed: Aug. 17, 2021

(65) Prior Publication Data

US 2022/0060479 A1 Feb. 24, 2022

Related U.S. Application Data

(60) Provisional application No. 62/706,450, filed on Aug. 18, 2020.

(51) Int. Cl.
*H04L 9/40* (2022.01)

(52) U.S. Cl.
CPC .......... *H04L 63/104* (2013.01); *H04L 63/105* (2013.01); *H04L 63/20* (2013.01); *H04L 2463/082* (2013.01)

(58) Field of Classification Search
CPC ..... H04L 63/104; H04L 63/105; H04L 63/20; H04L 2463/082; H04L 63/0853; H04L 63/0861; H04L 63/083

(Continued)

(56) References Cited

U.S. PATENT DOCUMENTS

| 8,495,720 B2 | 7/2013 | Counterman |
| 9,529,985 B2 | 12/2016 | Khalil et al. |

(Continued)

FOREIGN PATENT DOCUMENTS

| CN | 105359482 B | * 9/2019 | ............ H04L 63/08 |
| EP | 3528454 | 8/2020 | |
| WO | 2001095545 | 12/2001 | |

OTHER PUBLICATIONS

Lar Tiedemann Thorsen, "Multi-factor Authentication using Secure Elements," UiO Department of Informatics, University of Oslo, 112 pages, Master's Thesis Spring 2016.

(Continued)

*Primary Examiner* — Kambiz Zand
*Assistant Examiner* — Aubrey H Wyszynski
(74) *Attorney, Agent, or Firm* — Trenner Law Firm, LLC; Mark Trenner

(57) ABSTRACT

A system and method for a global approach for multifactor authentication incorporating user and enterprise preferences. An example method includes receiving a request from an enterprise computer for authentication of a user to access a resource of the enterprise. The example method also includes requesting available authentication methods and/or credentials at a point of authentication for the user. The example method also includes determining a set of authentication credentials to apply. The example method also includes receiving a requested set of authentication credentials from the point of authentication. The example method also includes authenticating the user based on the received set of authentication credentials from the point of authentication, and providing the user authenticated identity to the enterprise for access to the resource of the enterprise after authenticating the user.

20 Claims, 8 Drawing Sheets

(58) Field of Classification Search
USPC .............................................................. 726/4
See application file for complete search history.

(56) References Cited

U.S. PATENT DOCUMENTS

| | | |
|---|---|---|
| 2007/0186106 A1 | 8/2007 | Ting et al. |
| 2008/0021997 A1 | 1/2008 | Hinton |
| 2008/0072301 A1 | 3/2008 | Chia et al. |
| 2012/0216260 A1 | 8/2012 | Crawford et al. |
| 2014/0157381 A1 | 6/2014 | Disraeli |
| 2014/0331293 A1 | 11/2014 | Toole et al. |
| 2018/0075231 A1 | 3/2018 | Subramanian et al. |
| 2019/0238554 A1* | 8/2019 | Disraeli .................. G06F 21/31 |
| 2019/0253431 A1 | 8/2019 | Atanda |
| 2020/0163013 A1* | 5/2020 | Grayson ............... H04W 48/18 |
| 2020/0258627 A1* | 8/2020 | Setegn ................... G16H 80/00 |

OTHER PUBLICATIONS

Indu et al. "Identity and access management in cloud environment: Mechanisms and challenges." Engineering science and technology, an international journal 21.4 (2018): 574-588. May 23, 2018 Retrieved on Oct. 9, 2021 from https://www.sciencedirect.com/science/article/pii/S2215098617316750 entire document.

International Search Report and Written Opinion of the International Searching Authority in corresponding PCT patent application No. US2021/071204 issued Dec. 3, 2021, 9 pages.

\* cited by examiner

Fig. 6

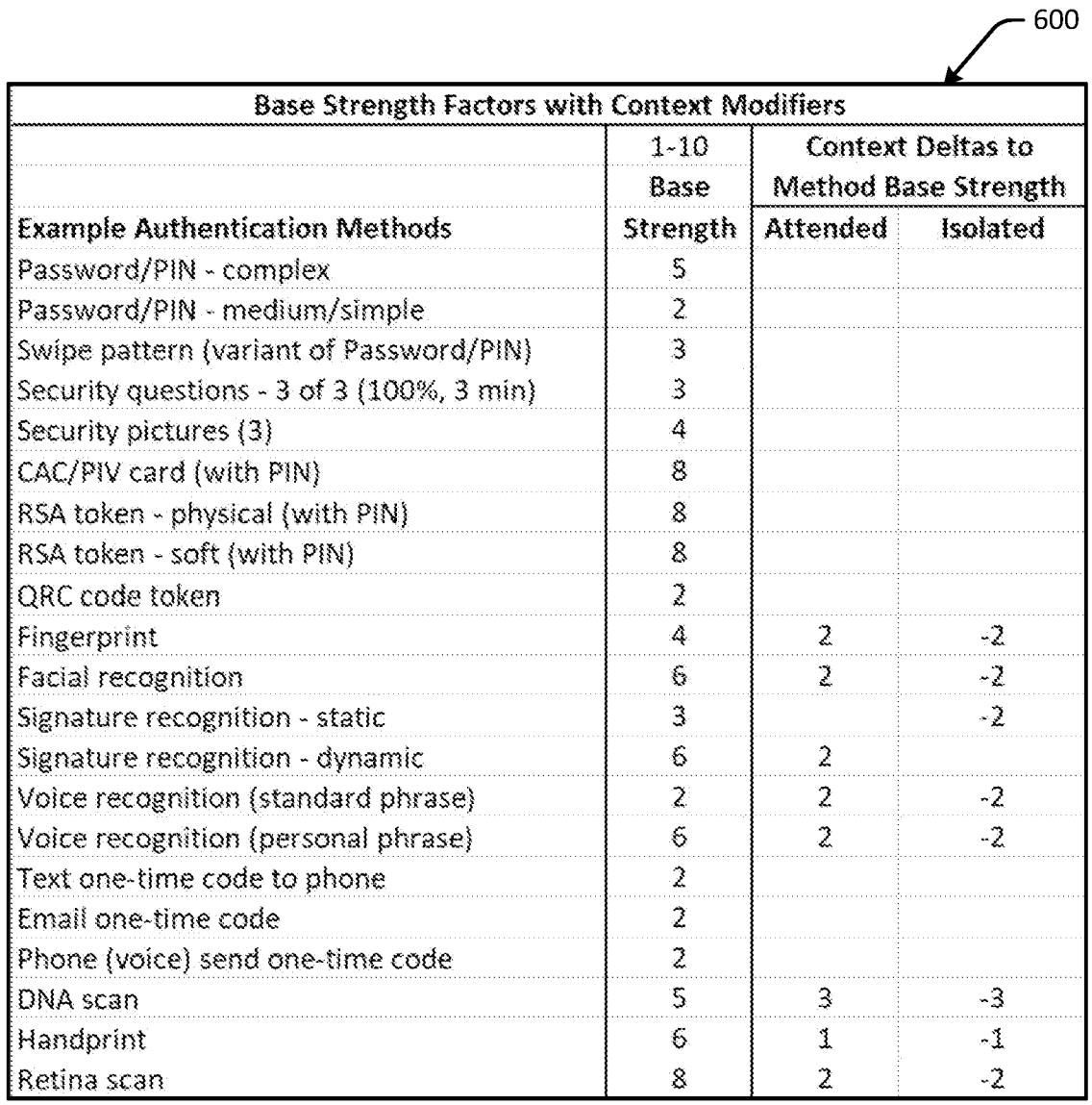

| Base Strength Factors with Context Modifiers | | | |
|---|---|---|---|
| | 1-10 Base Strength | Context Deltas to Method Base Strength | |
| Example Authentication Methods | | Attended | Isolated |
| Password/PIN - complex | 5 | | |
| Password/PIN - medium/simple | 2 | | |
| Swipe pattern (variant of Password/PIN) | 3 | | |
| Security questions - 3 of 3 (100%, 3 min) | 3 | | |
| Security pictures (3) | 4 | | |
| CAC/PIV card (with PIN) | 8 | | |
| RSA token - physical (with PIN) | 8 | | |
| RSA token - soft (with PIN) | 8 | | |
| QRC code token | 2 | | |
| Fingerprint | 4 | 2 | -2 |
| Facial recognition | 6 | 2 | -2 |
| Signature recognition - static | 3 | | -2 |
| Signature recognition - dynamic | 6 | 2 | |
| Voice recognition (standard phrase) | 2 | 2 | -2 |
| Voice recognition (personal phrase) | 6 | 2 | -2 |
| Text one-time code to phone | 2 | | |
| Email one-time code | 2 | | |
| Phone (voice) send one-time code | 2 | | |
| DNA scan | 5 | 3 | -3 |
| Handprint | 6 | 1 | -1 |
| Retina scan | 8 | 2 | -2 |

| Overlap Dimensions for Methods Sharing a Physical Factor | | | | | | |
|---|---|---|---|---|---|---|
| Overlap Factor | 0.5 | 0.8 | 0.9 | 0.3 | 0.9 | 0.5 |
| Example Authentication Methods | SmartDevice | Bio-hand | Bio-face | Bio-voice | Bio-eye | Bio-gene |
| Password/PIN - complex | Yes | | | | | |
| Password/PIN - medium/simple | Yes | | | | | |
| Swipe pattern (variant of Password/PIN) | | | | | | |
| Security questions - 3 of 3 (100%, 3 min) | | | | | | |
| Security pictures (3) | | | | | | |
| CAC/PIV card (with PIN) | | | | | | |
| RSA token - physical (with PIN) | Yes | | | | | |
| RSA token - soft (with PIN) | | | | | | |
| QRC code token | | | | | | |
| Fingerprint | Yes | Yes | | | | |
| Facial recognition | | | Yes | | | |
| Signature recognition - static | | Yes | | | | |
| Signature recognition - dynamic | | | | Yes | | |
| Voice recognition (standard phrase) | | | | Yes | | |
| Voice recognition (personal phrase) | | | | | | |
| Text one-time code to phone | Yes | | | | | |
| Email one-time code | Yes | | | | | |
| Phone (voice) send one-time code | Yes | | | | | |
| DNA scan | | | | | | Yes |
| Handprint | | Yes | | | | |
| Retina scan | | | | | Yes | |

Fig. 8

| User Preference Dimensions with Method Ratings | | | | | |
|---|---|---|---|---|---|
| Dimensions (Higher values for methods that have more impact in the dimension) | | | | | |
| Example Authentication Methods | Input | SmartDev | UniqueDev | Memory | PhysBio |
| Password/PIN - complex | 5 | 0 | 0 | 5 | 0 |
| Password/PIN - medium/simple | 3 | 0 | 0 | 3 | 0 |
| Swipe pattern (variant of Password/PIN) | 1 | 0 | 0 | 3 | 0 |
| Security questions - 3 of 3 (100%, 3 min) | 5 | 0 | 0 | 3 | 0 |
| Security pictures (3) | 5 | 0 | 0 | 3 | 0 |
| CAC/PIV card (with PIN) | 1 | 0 | 1 | 1 | 0 |
| RSA token - physical (with PIN) | 1 | 0 | 1 | 1 | 0 |
| RSA token - soft (with PIN) | 1 | 1 | 0 | 1 | 0 |
| QRC code token | 0 | 0 | 1 | 0 | 0 |
| Fingerprint | 0 | 0 | 0 | 0 | 1 |
| Facial recognition | 0 | 0 | 0 | 0 | 1 |
| Signature recognition - static | 1 | 0 | 0 | 1 | 0 |
| Signature recognition - dynamic | 1 | 0 | 0 | 1 | 0 |
| Voice recognition (standard phrase) | 1 | 0 | 0 | 0 | 1 |
| Voice recognition (personal phrase) | 1 | 0 | 0 | 1 | 1 |
| Text one-time code to phone | 1 | 1 | 0 | 0 | 0 |
| Email one-time code | 1 | 1 | 0 | 0 | 0 |
| Phone (voice) send one-time code | 1 | 1 | 0 | 0 | 0 |
| DNA scan | 0 | 0 | 0 | 0 | 5 |
| Handprint | 0 | 0 | 0 | 0 | 3 |
| Retina scan | 0 | 0 | 0 | 0 | 5 |

…

GLOBAL APPROACH FOR MULTIFACTOR AUTHENTICATION INCORPORATING USER AND ENTERPRISE PREFERENCES

PRIORITY CLAIM

This application claims the priority filing benefit of U.S. Provisional Patent Application No. 62/706,450 filed Aug. 18, 2020 of Edward A. Perkins, et al. titled "Global Approach For Multifactor Authentication Incorporating User and Enterprise Preferences," hereby incorporated by reference for all that is disclosed as though fully set forth herein.

BACKGROUND

Enterprises and/or applications (referred to herein interchangeably as "enterprise") that use authentication as part of the process to grant access to secure resources, maintain a copy of the credentials for each user (e.g., a password hash). The enterprise constrains the authentication methods and defines (typically, unilaterally) what constitutes "good enough" protection for authentication. Users are typically forced to maintain a large number of different authentication credentials (e.g., passwords, although other forms of credentials are also commonplace) for all of the enterprises they interact with. Users are potentially limited by the enterprises' assessment of what constitutes "good enough" protection for the users' personal data stored on their systems.

The net result is that users implement solutions for managing their credentials that leave them open to theft and fraud, and disenfranchises them from control for access to their own information stored on enterprise systems. An additional undesirable side-effect of each enterprise independently implementing authentication mechanisms and storing credentials is that it slows down the adoption of new authentication technologies, as each enterprise must not only incorporate the technology into their own authentication systems, but the users must each provide their credentials for the new approach for each enterprise they access that uses the approach.

Protocols such as Security Authentication Markup Language (SAML) and OAuth have been developed to provide a framework for authentication technologies. These protocols have been utilized to implement Single Sign-On (SSO) capabilities within enterprises and also for some web-based Authentication Services that are targeted toward outsourcing the IT infrastructure for authentication. These services typically control the decisions regarding the implementation and scope of authentication, simply replacing in-house capabilities. Some services like GOOGLE® and FACEBOOK® offer free third-party authentication, but create severe privacy concerns due to tracking and selling user data. Other applications and services are targeted toward providing a secure method for managing a user's passwords in a single tool or repository.

BRIEF DESCRIPTION OF THE DRAWINGS

FIG. 6 is a table showing example base strength factors with context modifiers which may be implemented by the identity service provider.

FIG. 7 is a table showing example overlap dimensions for methods sharing a physical factor which may be implemented by the identity service provider.

FIG. 8 is a table showing example user preference dimensions with method ratings which may be implemented by the identity service provider.

DETAILED DESCRIPTION

A global approach for multifactor authentication incorporating user and enterprise preferences is disclosed herein. The system described herein may be implemented to provide access to business systems, data, processes, and even to physical objects and/or entry to physical boundaries, based on user Identity Management Services previously the domain of passwords and other security credentials.

An example of the system and method implements a (user)×(enterprise)×(authentication methods) technique of credential establishment and management. An implementation of the system and method may be referred to as a "service" provided by what is referred to herein as an identity service provider. In an example, the service manages the credential information securely. This eliminates the need for individual credential custodians, so the user is able to manage their authentication credentials in one place and not maintain separate credentials for every enterprise.

It is noted that an "enterprise," as the term is used herein, refers to a subscriber to the service (e.g., a business) that is providing enhanced identity management according to the systems and methods disclosed herein. A "user" or "end-user" as these terms are used interchangeably herein, refers to a user such as an individual or person (or group of people) that is utilizing the systems and methods disclosed herein to securely manage their identity usage with one or more enterprises.

In an example, the systems and methods disclosed herein enable a mix of authentication factors, and is not limited to a preset list of factors. This permits the number and type of contributing factors to vary and evolve over time, even for the same user authenticating to the same context. This addresses the reduced potency of overlapping authentication factors, (e.g., a password and text messaging that may both be available on the same device).

In an example, a canonical authentication strength provides a common expression for the expected confidence in the user identity produced by an arbitrary combination of authentication methods. Incorporation of user preferences in the authentication process provides the consumer/owner of an asset influence in the intensity with which authentication barriers are presented.

In an example, a user data encryption token may be maintained outside the enterprise hosting the encrypted data and provided by a service for further security.

Before continuing, it is noted that as used herein, the terms "includes" and "including" mean, but is not limited to, "includes" or "including" and "includes at least" or "including at least." The term "based on" means "based on" and "based at least in part on." The term "canonical" as used herein, means conforming to an established procedure or authorized, recognized, or accepted rule.

Figure 1:
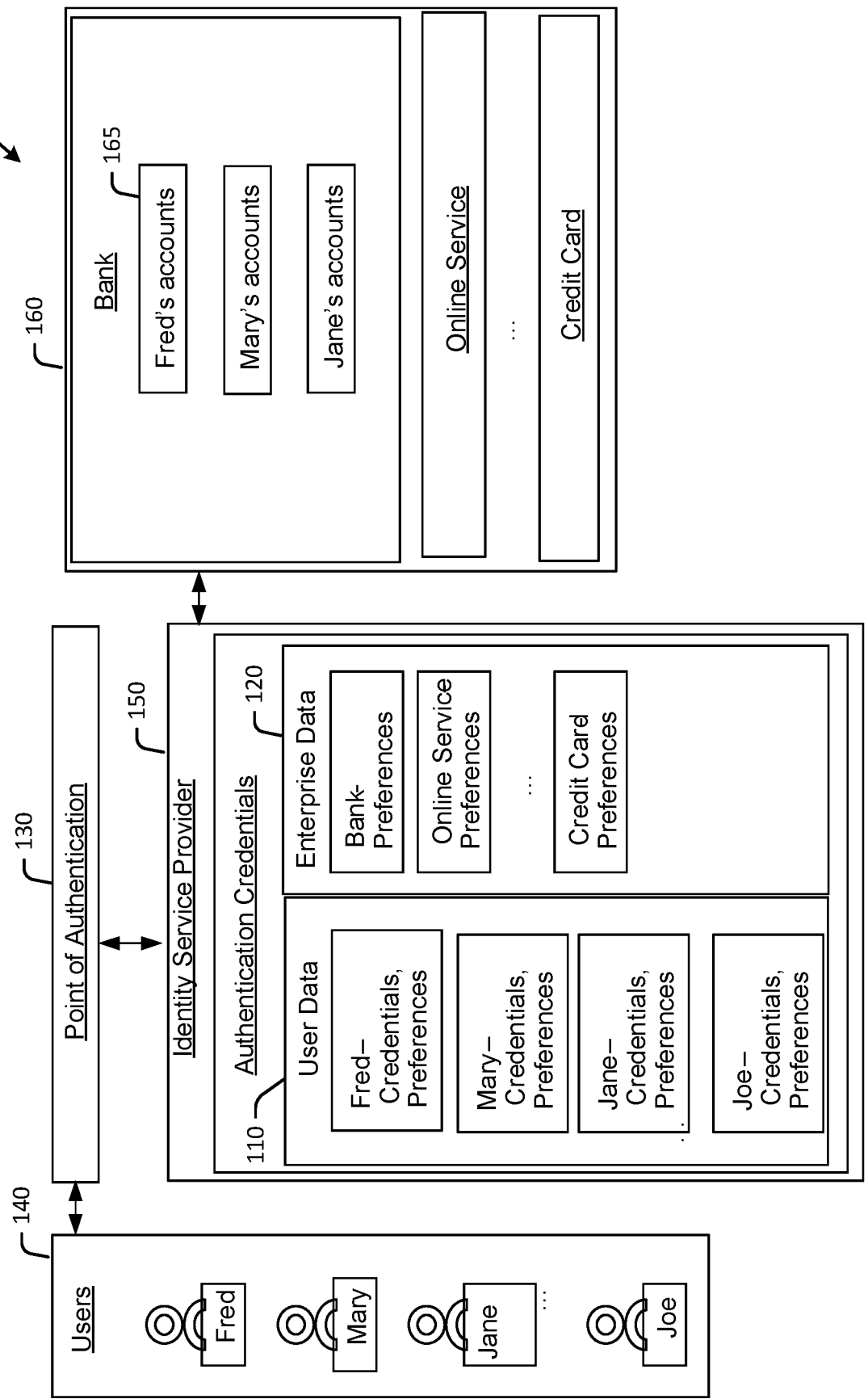
FIG. 1 is a block diagram illustrating an example of a networked computer environment implementing multifactor authentication incorporating user preferences and enterprise preferences.

FIG. 1 is a block diagram illustrating an example of a networked computer environment 100 implementing multi-factor authentication incorporating user preferences 110 and enterprise preferences 120. An example system includes a point of authentication 130 for a user. The point of authentication 130 may be a user device, such as a computer (e.g., laptop or desktop), mobile device (e.g., mobile phone or tablet), or other device having available hardware and/or software to locally gather and/or authenticate credentials for a user 140.

An example system also includes an identity service provider computer system 150 configured to receive a request from an enterprise computer system 160 for authentication of the user 140 to access a resource 165 of the enterprise. A set of authentication credentials is determined by the identity service provider computer system 150 to apply based on a combination of factors. Example factors may include, but are not limited to, a canonical authentication strength, context, the available authentication methods and/or factors at the point of authentication, the user preferences, and the enterprise preferences.

During operation, the identity service provider computer system 150 receives the set of authentication credentials from the point of authentication 130 to authenticate the user 140 based on the authentication credentials received from the point of authentication 130. The identity service provider computer system 150 provides the authentication result for the user 140 to the enterprise for use in determining if the user is eligible for access to the resource of the enterprise.

In an example, the canonical authentication strength provides a common expression for an expected confidence in an identity of the user 140, and the canonical authentication strength is produced by an arbitrary combination of authentication methods.

Figure 2:
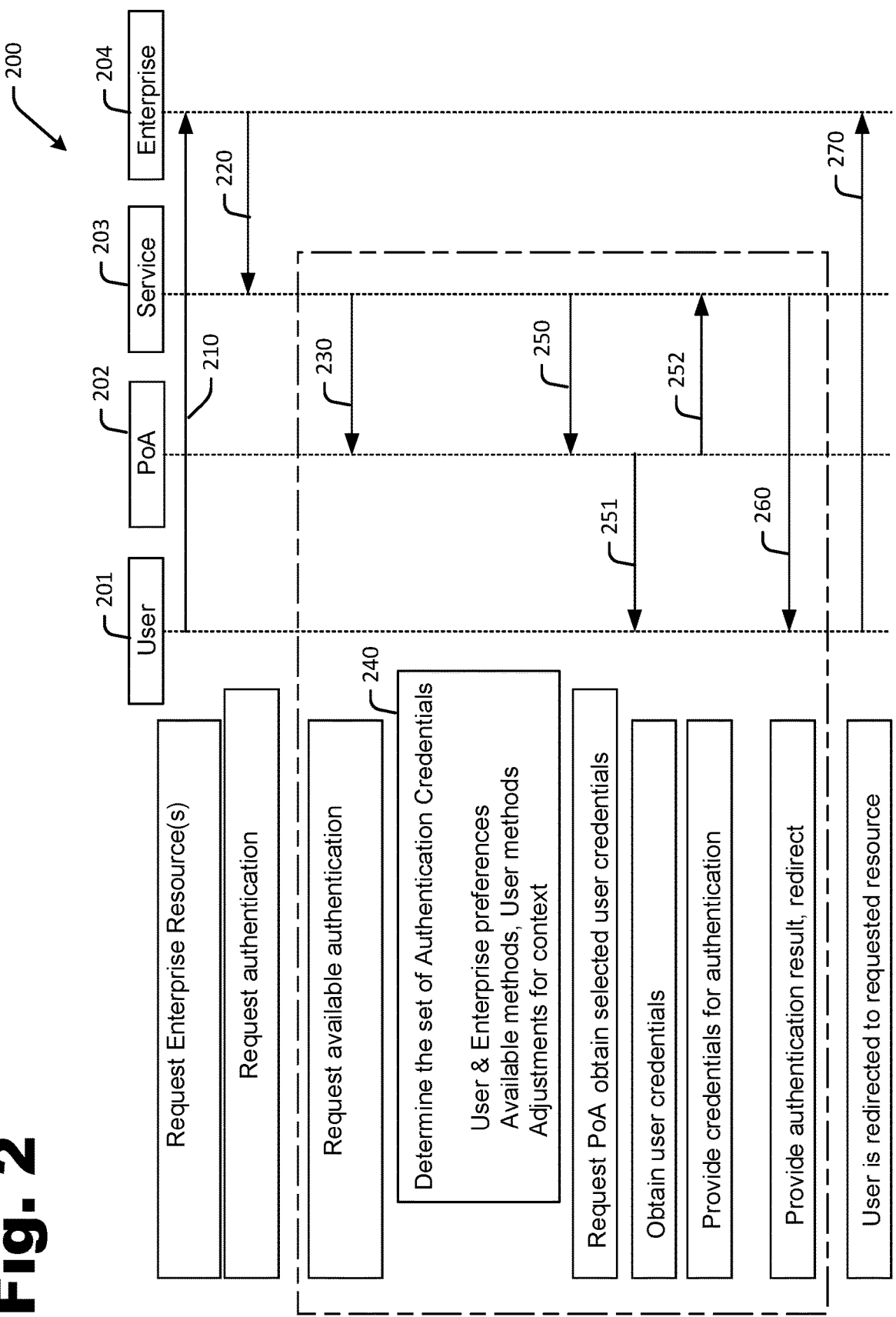
FIG. 2 is a process flow diagram illustrating example operations implementing multifactor authentication incorporating user preferences and enterprise preferences.

FIG. 2 is a process flow diagram illustrating example operations 200 implementing multifactor authentication incorporating user preferences and enterprise preferences. In an example, operation 210 includes the enterprise 204 (e.g., computer system 160 in FIG. 1) receiving a request from a user 201 (e.g., user devices 140 in FIG. 1) to access resource(s) (e.g., resource 165 in FIG. 1). Resources may be computer resources (e.g., access to an application, data) or physical resources (e.g., access to computer processing or access to a physical space).

Example operation 220 includes the identity service provider 203 receiving a request from the enterprise 204 for authentication of the user 201 in order to grant access to the resource of the enterprise 204. In example operation 230, the identity service provider 203 requests available authentication credentials at a point of authentication 202 (e.g., device 130 in FIG. 1) for the user 201.

In example operation 240, the identity service provider 203 determines a set of authentication credentials to apply. This determination 240 may be based on a combination of factors. Example factors include, but are not limited to context, the available authentication credentials at the point of authentication, the user preferences, and the enterprise preferences. The context may be ranked as strong for trusted authentication (e.g., an attended point of authentication, such as a bank representative), and ranked as weak (e.g., for an unattended point of authentication).

The identity service provider 203 requests 250 the set of authentication credentials determined in example operation 240 from the point of authentication 202 for the user 201, which the point of authentication 202 obtains in operation 251 and provides to the identity service provider 203 in operation 252. The identity service provider 203 authenticates the user 201 based on the received set of authentication credentials from the point of authentication 202, and provides the authenticated identity for the user 201 to the enterprise for access in example operation 260. In example operation 270, the user 201 is granted access to the resource of the enterprise 204 (e.g., redirected to the application software of the enterprise 204, granted physical access to a restricted space, etc.) after authenticating the user.

In an example, the identity service provider 203 provides a canonical authentication strength. The canonical authentication strength may provide a common expression for an expected confidence in an identity of the user. The canonical authentication strength may be produced by an arbitrary combination of authentication methods.

In an example, incorporation of user preferences during the authentication provides the user 201 with influence in determining an intensity with which authentication barriers are presented. That is, the user 201 may select which authentication credentials the user is willing to provide to the enterprise. For example, the user 201 may be willing to provide a password for access to an online software application, but willing to provide facial recognition for access to the user's bank account.

In an example, incorporation of enterprise preferences during the authentication provides the enterprise 204 influence in determining an intensity with which authentication barriers are presented. That is, the enterprise 204 may select which authentication services the enterprise is willing to accept before granting access to a resource. For example, the enterprise 204 may be willing to accept a password and security code sent via text message for access to a user's social media account, but the enterprise may require stronger authentication (e.g., biometric authentication) for access to personal information such as health records.

In an example, the system and method enables a mix of authentication factors/methods so that a number and type of authentication factors vary, even for the same user authenticating to the same context. That is, the user may be willing to provide five authentication factors, three of which are acceptable to the enterprise (among others that the user is not willing to provide or are not supported by the Point of Authentication). This overlap ensures both the user preferences and the enterprise requirements are met. The mix of authentication factors reduces potency of overlapping authentication factors. For example, a variety of authentication factors enables the enterprise to require different methods of authentication when a password and text message may both be available on the same device and therefore be less certain as to the authenticity of the authentication.

In an example, the system and method provides a service for the user to manage credential information securely and eliminate individual asset custodians (e.g., as maintained by a multitude of different enterprises), so that a user can manage the credential information altogether in one place for use in authenticating to a variety of different enterprises and resources.

In an example, the system and method maintain a user data encryption token by a third party (the service 203) outside of the enterprise for additional authentication. Still other types of authentication techniques, either now known or later developed, are contemplated as being within the scope of the present disclosure.

In an example, the system and method provide a global authentication service (regardless of user platform, enterprise and/or resource being accessed), that provides unique user authentication from the convenience of a central source or credential management platform.

In an example, the identity service provider determines the set of authentication credentials to apply from all available authentication credentials at any given time. This determination 240 is subject to an algorithm or algorithms which may vary based on design considerations, such as the enterprise and/or resources being accessed, the types of authentication available, among other factors. For example, determining the set of authentication credentials may be based on available authentication credentials at the point of authentication (e.g., the user's mobile device, a device attended by a third party such as a banker's computer, etc.). In another example, determining the set of authentication credentials is based on user credentials that the user has registered with the service (e.g., if the thumbprint is available for a particular user but facial recognition is not).

In an example, candidate parameters for the collection of authentication factors include co-dependence on a single object (e.g., password entry on a mobile device to which a security code is sent via text) that may be compromised and/or the environment in which the transaction is being performed (e.g., attended or unattended).

In an example, the strength for a collection of authentication factors from which the set of authentication credentials is determined is based on a nominal strength for each factor. Examples are described in more detail below with reference to FIGS. 6-8.

The examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

Figure 3:
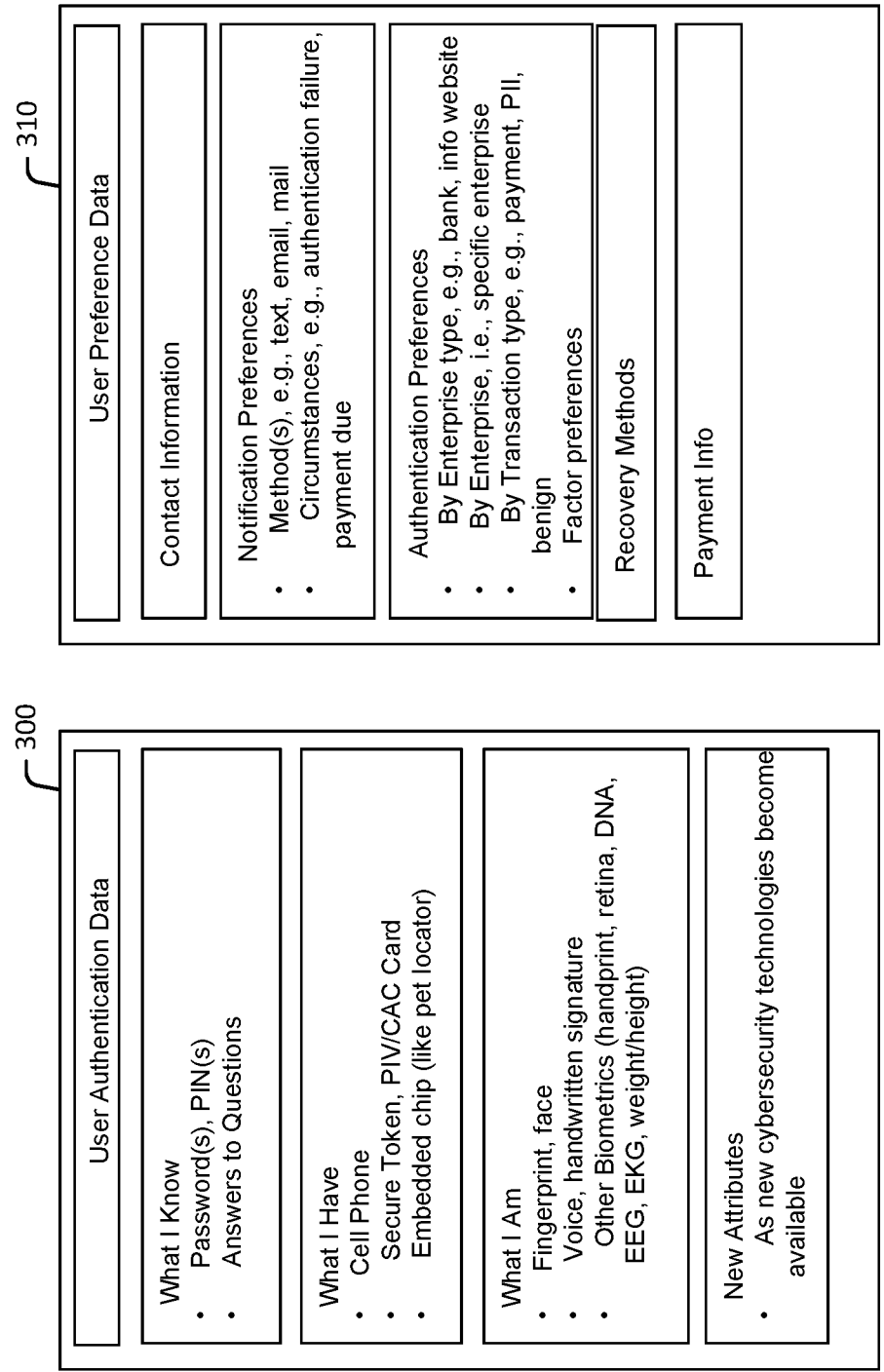
FIG. 3 illustrates example types of user authentication data and user preference data which may be implemented by the identity service provider during authentication.
Figure 4:
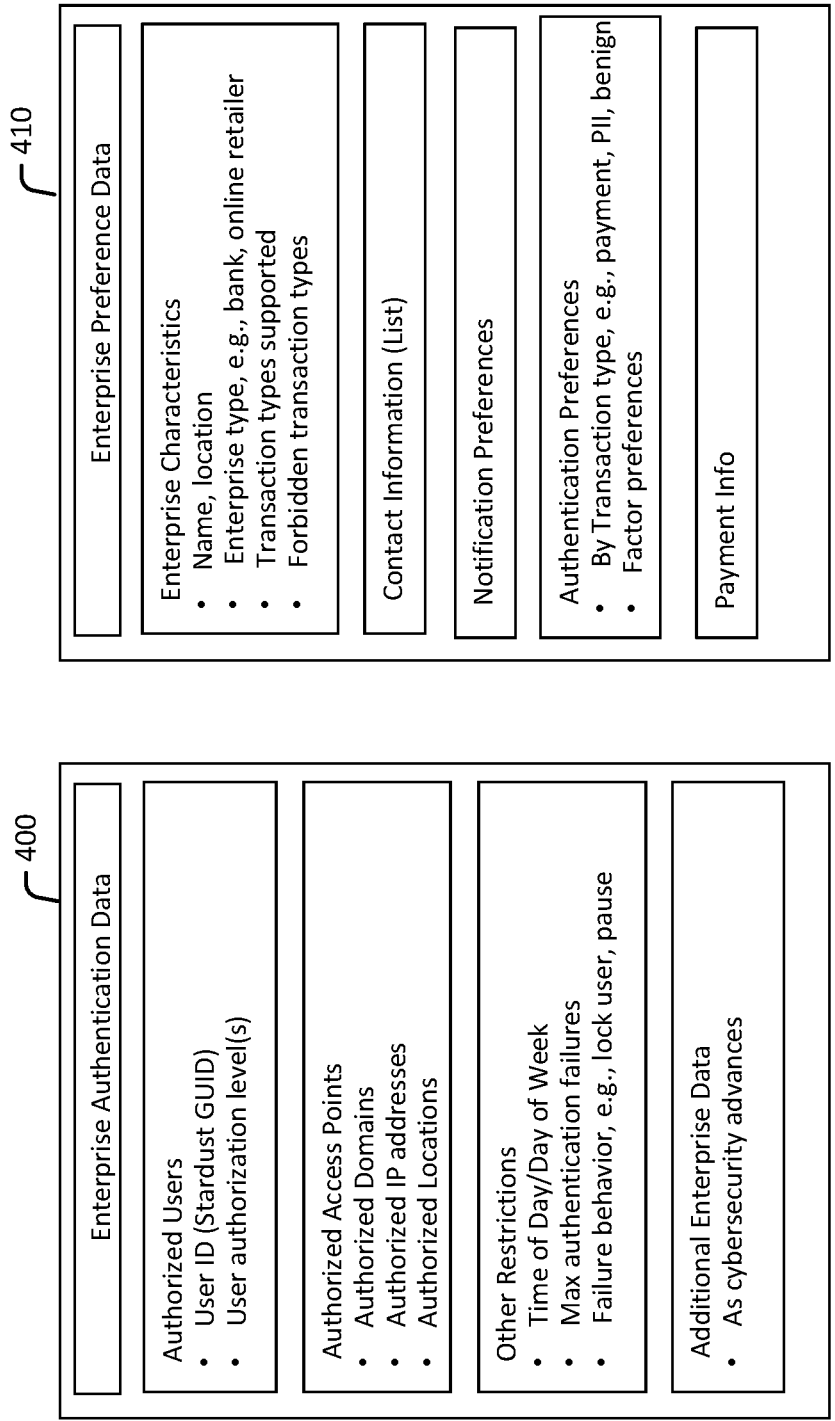
FIG. 4 illustrates example types of enterprise authentication data and enterprise preference data which may be implemented by the identity service provider during authentication.
Figure 5:
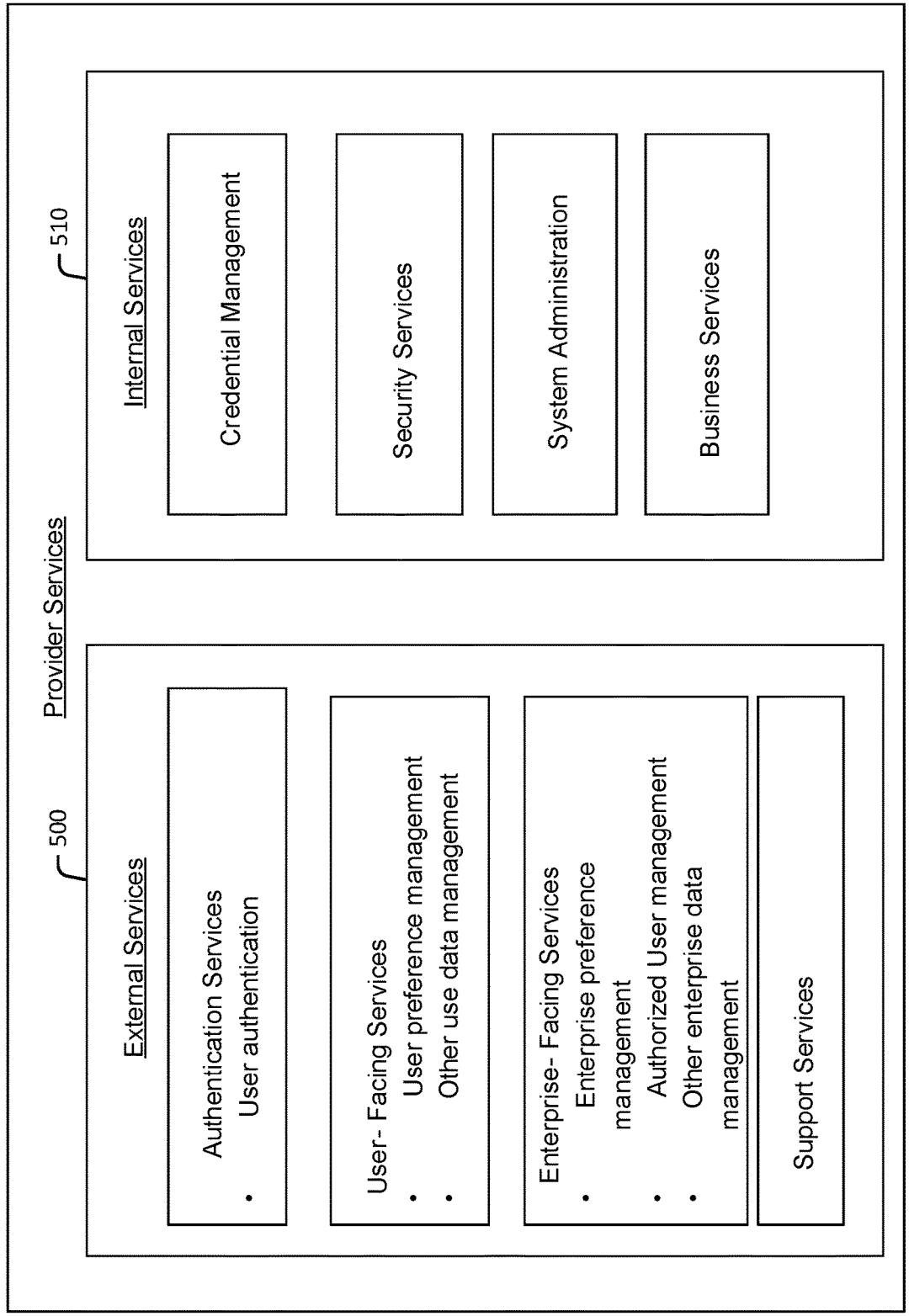
FIG. 5 illustrates example external services and internal services which may be provided by the identity service provider during authentication.

FIG. 3 illustrates example types of user authentication data 300 and user preference data 310 which may be implemented by the identity service provider during authentication. FIG. 4 illustrates example types of enterprise authentication data 400 and enterprise preference data 410 which may be implemented by the identity service provider during authentication. FIG. 5 illustrates example external services 500 and internal services 510 which may be provided by the identity service provider during authentication. It is noted that the examples shown in FIGS. 3-5 are provided only for purposes of illustration and are not intended to be limiting. Other examples are also contemplated as being within the scope of the present disclosure, as will be readily understood by those having ordinary skill in the art after becoming familiar with the teachings herein.

In an example, the identity service provider determines the combination of authentication methods to apply based on all techniques available to the service (at any given time). Selection of technique(s) may be based on, by way of non-limiting example, methods implemented at the point of authentication (e.g., a web login proxy), methods for which the user has credentials, and algorithm(s) that implement a canonical "strength" calculation to determine which set of available methods meets the user and enterprise criteria.

A canonical strength permits users and enterprises to express their requirements for the level of confidence (trust) that a user is who they claim to be for any given circumstance. The strength for a collection of authentication factors may be based on a nominal strength for each factor. An option may be provided for adjustments based on factors that impact the viability of the method under given circumstances. The details of these factors can evolve over time as the cybersecurity domain evolves. Example candidate parameters can include items such as co-dependence on a single object that may be compromised (e.g., a compromised cell phone may give access to texts, emails, software tokens, etc.) and/or environment (e.g., a manned bank teller station may make it harder to spoof a retina scan than an Automated Teller Machine in an alley).

Enterprise and user level preferences may also be configured with the identity service provider. Examples include, but are not limited to, preferring or prohibiting a particular authentication method, and preference for choosing methods when multiple sets of methods may meet the required "strength" (e.g., fewest methods, least dependency on user memory, least typing, least number of devices). Configuration parameters may be adjusted, e.g., manually, via static or dynamic algorithms, or utilizing Artificial Intelligence (AI) methods.

In an example, a global approach for multifactor authentication incorporating user and enterprise preferences may include provision of sample point of authentication proxies for mainstream business use-cases. These proxies may implement authentication methods based on available resources (e.g., fingerprint scanner). The proxies may also manage the interaction with the authentication server on behalf of the enterprise. Existing technologies may be leveraged, such as Security Authentication Markup Language (SAML) to facilitate integration into existing enterprise Information Technology (IT) infrastructures. This approach provides a method for enterprises to rapidly adopt new authentication methods with minimal delay and at minimal cost. An enterprise may also utilize the authentication credentials to support a SSO service within the enterprise (or federation of enterprises). For example, the enterprise may use shibboleth, a community-wide password that enables members of that community to access an online resource without revealing their individual identities.

In addition to providing authentication results, the example global approach for multifactor authentication incorporating user and enterprise preferences may provision a token to encrypt/decrypt user data on the enterprise system. This means that individual user data cannot be read on the system without the user explicitly authorizing it. In addition, if user data is stolen from the enterprise, the enterprise does not have the key (and thus it cannot be stolen together with the user data) to decrypt the user-encrypted data. Furthermore, each user's data may have a separate key, rendering brute-force attacks to decrypt stolen user-encrypted data highly unlikely, as each user's data may have to be decrypted separately.

The following is an example algorithm which may be implemented by the identity service provider to calculate required strength. Example inputs to the algorithm include a Request Category, User preferences, and Enterprise Preferences.

Analytic function of inputs=max(Service, Enterprise, User: by Category)
        Fetch usermin: user min strength for category
            If none specified, fetch user general min strength
                If none specified, zero (no min)

Fetch enterprisemin: enterprise min strength for category
  If none specified, fetch enterprise general min strength
    If none specified, zero (no min)
Fetch sdmin: strength for category
  If category not found, fetch default min strength (always available)
Request min strength=max(usermin, enterprisemin, sdmin)
  Context deltas are per-method, not part of the request strength
Output:
  Authentication Strength for this request
  Strength cannot be less than or equal to zero The following is an example algorithm which may be implemented by the identity service provider to identify authentication methods to be applied by service. Example inputs to the algorithm include a Required Minimum (Authentication) Strength, Method characteristics, User preferences, Context and Overlap dimensions. The term "User Agent" is used to identify the entity/capability that implements the interface to the service for authentication requests.

Start with the set of mechanisms/methods available to the User Agent
  Remove if requestor data not valid (incompatible mechanisms, invalid attributes)
  Order available methods by overlap+user preference
  Use User Preference Dimensions for ordering
  Apply overlap factor to get current method strength, where successive methods that overlap in a particular dimension, e.g., a shared physical device like a smartphone, add with successively reduced weight $$\text{Strength for an individual factor} = (\text{base} + \text{context delta}) * (\text{overlap factor})^{\wedge}(\text{occurrence index})$$

Order available methods based on user preferences+strength
Use User Preference Dimensions for ordering:
  Select available methods until sum(current strength) >=Required Strength Allow user to deselect methods, e.g., deselect Personal Identity Verification (PIV) if the user does not have their PIV card with them.
Remove any "extra" methods, e.g., if desired strength=6 and methods encountered in order of preference had strengths 1, 2, and 6, the first two methods may be removed as unneeded.
Adjust on retries (e.g., remove failed mechanism/method, reevaluate)
Output:
  Set of methods to request from User Agent
  Feedback on which preference drove the strength if not able to meet.

The following are example use-cases to illustrate an example Global Approach for Multifactor Authentication Incorporating User and Enterprise Preferences. These use-cases are exemplary and non-limiting. Still other use-cases will be readily apparent to those having ordinary skill in the art after becoming familiar with the teachings herein.

OpsCon Overview—Use. This example use-case addresses the behavior of the system from the perspective of an individual that is seeking to authenticate to another entity (e.g., the Enterprise). All authentication transactions involve a User (seeking to be authenticated) and an Enterprise (using the authentication result to grant access to the User).

OC-U010 New User Setup. This example use-case addresses basic setup of a user account, including gathering information necessary to establish that the user is the authorized owner of the account in the event of a lost password or other reset situation. Once sufficient user information is gathered, the new user is published to the authentication services for immediate use. Query user for data to setup user account based on user base credentials such as Global Unique ID (GUID), Username (e.g., an email address or cell phone number), and Password.

If the user specifies email or other "unique address" for username/recovery/anything, send confirmation code and require the user to enter the code to confirm they own the email account. Example user authentication preferences may include min authentication strength (by class), geographic limits, etc. Additional authentication services may include enrolling if the user already has, or placing an order for a new RSA token, Common Access Card (CAC, credit card size ID card, with chip) also called PIV, or Biometric data (fingerprint, voice, face, etc.). Example user data entry mechanisms may be via web or operating system interface.

OC-U020 User Credential Management. This example use-case includes updates to a user account. The user may update information such as notification preferences and payment method. The user may also request that their account be locked for authentication. This is similar to initial setup in terms of the items that are accessed, with some differences noted below. Note that the user must confirm changes in order to prevent accidental updates that block user access (can't use immediate commit).

In an example, the user must authenticate at the start of the session (see OC-U030 Basic User Authentication—Success, OC-U040 User Authentication Failure). Must integrate with "User Reset" smoothly since that is a likely starting point. User interface populated with existing user data. Identity strength consistent with type of update. Verification of updates before committing (user required to confirm updates). Adding and/or updating additional authentication services, such as, RSA token, CAC/PIV card, and Biometric (fingerprint, voice, face, etc.).

OC-U030 Basic User Authentication—Success. This example use-case addresses the normal flow of a user authenticating, e.g., logging in to an account with an Enterprise. An example utilizes existing authentication protocols to the greatest extent possible to facilitate integration. Note the user control over the level of security applied. It is also noted that the Enterprise may not receive the user's GUID until they've successfully authenticated.

In an example, the user selects "Login Using The Service". The Enterprise system sends an initial authentication request to the identity service provider. Examples include: Username or user GUID; Enterprise ID, session type (e.g., Banking, Credit Card Purchase) and location type; Endpoint ID (IP address, node name, something to identify the access point); Authentication mechanisms (e.g., fingerprint reader); Optional params: Increase auth strength, locale ID; Context-sensitive mechanisms, and challenge/response mechanisms e.g., Completely Automated Public Turing test to tell Computers and Humans Apart (CAPTCHA) for unattended (e.g., web) authentication.

The identity service provider determines the authentication approach. The service pulls enterprise data—if invalid (e.g., enterprise unknown or locked), return enterprise failure; The service also pulls user preferences. If the user is locked, then the service returns user locked failure—except if an authentication request originating from User Management services (OC-U020). The identity service provider determines which authentication mechanism(s) to employ based on user and enterprise preferences and available mechanisms. If no set of factors available that meet the enterprise threshold, return enterprise threshold failure. If no set of factors available that meet user threshold, return user threshold failure.

The identity service provider responds with request status and requested authentication mechanism(s), if successful. If successful, Enterprise collects requested user authentication data and returns it to the service and the service returns success status, User GUID and credentials. If failure status, option to change methods to be used, and if successive failure count exceeded, trigger UC-S050—Problematic User Behavior.

OC-U040 User Authentication Failure. This example use-case addresses where a user has attempted to authenticate (Basic User Authentication—Success), but the final step is the return of a failure status. The following differences apply.

In an example, the service creates a record of the failed login, which may include: Time of start of transaction; Time of failure response; Enterprise and associated request data; User GUID (flag if invalid username). The identity service provider assesses if the login failure represents a bigger problem. If the Enterprise/node is showing excessive failures, then lock Enterprise/node, and if the User is showing excessive failures, then lock User. The identity service provider also assesses failure patterns. If an alternate factor is possible, change requested parameters (e.g., Increasing delay in response). The service also assesses if notification is required. For example, the identity service provider may issue a user notification for failed authentication (user preferences), and/or an Enterprise notification for excessive failures/patterns. The system may also detect broader patterns that are indicative of an attack, identifying the targeted and/or affected Enterprise(s) and/or User(s), responding accordingly.

OC-U045 Distress Mode User Authentication. This example use-case addresses the situation where a user has indicated that they are attempting to authenticate under duress. For example, an assailant is forcing them to log in to an ATM or bank account. The service must respond with authentication SUCCESS, but separately notify authorities. The authentication process must be undistinguishable to an observer that does not already know the user's specific distress mode credentials.

OC-U050 User Change of Strength/ID (e.g., switch to/from admin). This example use case addresses the situation where a user that has already authenticated (Basic User Authentication—Success) is changing their "role" with the Enterprise. This situation may arise if a user has to elevate privileges (e.g., from a normal user to system administrator) or change their authorization status from "employee" to "customer" in order to gain access to different resources. This follows the same flow as Basic User Authentication—Success. Reuse may alter the interface to only include the "new" factors requested.

OC-U070 Transactions for Suspended User (e.g., payment method denied, problem behavior). This example use-case addresses the situation where a user is attempting to login, but their ID is suspended (ID exists and is valid, but authentication is either partially or totally suspended).

A user ID may be temporarily locked for all use due to suspicious activity (OC-S050), User inactivity (OC-U090), User requested lock (OC-U020). A user may also not be completely locked, but have one or more authentication methods suspended, e.g., due to nonpayment from the payment method being expired. If the user is completely locked out, the identity service provider returns the user locked status when the Enterprise initiates an authentication session. If authentication factors are suspended, they are simply not included in the authentication options.

OC-U080 User dies or is incapacitated. This example use-case addresses the situation where the service is notified that a user is either permanently (e.g., dies) or temporarily (e.g., conservatorship) unable/unauthorized to use the service to authenticate. In the case of a permanent inability to use the service, the account is closed (OC-U100). In the case of temporary inability, the user account is locked and the lock expiry date is set to "never". When the user is able to use the service again, the user unlocks their ID. If the inability becomes permanent, the username is cleared.

OC-U090 Inactive Accounts (e.g., user dies or quits using the service). This example use-case addresses the situation where a user account experiences no activity over an extended period of time. The service runs periodic checks to identify users that have had no activity in <inactivity base threshold> days, or longer. Depending on the length of inactivity, the service automatically notifies the user that their account is flagged as inactive, notifies the user that their account is flagged as inactive (second notice), locks the user account (expiry="never"), closes the user account (OC-U100), and notifies the user.

OC-U100 Closing User Account. This example use-case addresses the situation where a user is permanently "closed". Note that the basic user record remains intact so transactions and other data that references the account remains healthy. The user record is locked (all transactions disabled) with an expiry date of "never", and the username is cleared in order to enable reuse of usernames. All authentication factors are removed. The update is logged (provides a trace from old username to permanent GUID). In the case where closure is due to death of the user, the executor or inheritor gains access to the asset(s) in accordance with prevailing laws and regulations.

OpsCon Overview—Enterprise. This example includes several use-cases that are focused on the behavior of the service system from the perspective of an entity that is seeking to use the service to authenticate a user. In this context, the identity service provider is itself an enterprise.

OC-E010 New Enterprise Setup (authorized managing users, payment, authentication methods, authentication types like browsing/banking, geographic/IP info, etc.). This example use-case addresses the basic setup of an Enterprise account, including gathering information necessary to support management of the Enterprise data at the service, and to establish the policies that the service uses to respond to User authentication requests from the Enterprise. Once sufficient Enterprise information is gathered, the new Enterprise is published to the authentication services for immediate use.

In an example, the user representing the Enterprise authenticates to the service. The user requests the setup of a new Enterprise. The service verifies user is authorized to represent enterprise, e.g., via any of the following: Account for large enterprises that have corporate authorization mechanisms; Account for so called "Ma & Pa" (small) enterprises (maybe a household); Distinguishing factor may be "public presence". The service sets up an enterprise account, e.g., including a Unique ID (GUID) and/or Enterprise Name. The current user is linked as an Enterprise Manager with full privileges. Authorized Enterprise Management users linked to the account may have a management password for secondary authentication (e.g., User GUID, Privilege level). Example enterprise preferences may include: Authentication rules (minimum strength in general, by type); Additional services, e.g., RSA tokens or CAC/PIVs; Management access rules, e.g., approval by existing full manager; User data encryption key used. Subordinate entities may include: Physical locations/stores, country, etc.; Internet location (URL, IP address); and Separate authentication strength rules (override of main). A completed record is stored and pushed to the service. Other than name uniqueness, the service does not provide any enforcement for names that may already be copyrighted, trademarked, or protected by other legal means.

OC-E020 Enterprise Configuration Management. This example use-case is similar to the basic setup of an Enterprise account (OC-E010). One difference is that the initial steps to create a new Enterprise account and assign the initial Manager are replaced by simple authentication as a Management User for the Enterprise. After the Enterprise information is approved by the User, the new Enterprise is published to the authentication services for immediate use.

OC-E030 Managing Users with Multiple Roles in a Single Enterprise (e.g., employee and customer, quits company). This example use-case addresses where a User has multiple roles within a given Enterprise. In this case, the Enterprise may have multiple roles for the individual. The Enterprise manages which Enterprise resources and services each role may access. The Enterprise maintains the association of a User (GUID) with one or more roles. The Enterprise is responsible for managing authorization to access Enterprise resources and services, with the service authenticating that the individual is in fact the "owner" of the Username/GUID used in the authentication process.

OC-E040 Managing Users with Multiple Thresholds. This example use-case addresses the case where an Enterprise recognizes different levels of access authorization for a single user (not necessarily a user with distinct separate roles). An example is if an Enterprise included resources/services for browsing non-sensitive resources (user-accessible inventory data), credit card data (for initiating payments from recorded credit card information) and medical history data (prescription history). The Enterprise may offer "partitioned" access, with a specific authentication strength appropriate for each type of resource. In this case, the Enterprise invokes UC-U050 to change the User's authentication strength.

OC-E050 Transactions for Suspended Enterprise. This example use-case addresses the situation where an Enterprise is attempting to use the service to authenticate a User, but their account is suspended (account exists and is valid, but authentication is either partially or totally suspended). An Enterprise account may be temporarily locked for all use due non-payment (payment method denied), suspicious activity or user (Authorized Manager) requested lock. Single nodes may also be suspended. An Enterprise may also not be completely locked, but have one or more authentication methods suspended, e.g., due to nonpayment from the payment method being expired.

If the Enterprise or location/node is completely locked, return enterprise locked status when Enterprise initiates the authentication session. If authentication factors are suspended, they are simply not included in the authentication options.

OC-E060 Reset Credentials Given to Enterprise for User Data. This example use-case addresses the case where new User credentials (encryption key for data stored within the Enterprise) are provided by the service. This use-case is initiated either by a request from the Enterprise (for one or more Users), by a User (for one or more Enterprises), or by a security use-case (for one or more Enterprises and/or Users). For each user, the service: retrieves the current encryption credentials, and calculates new encryption credentials. For each enterprise (specific to the User), the service provides the current and new encryption credentials.

Upon receipt of the current and new credentials for a User, the Enterprise: decrypts all data for the User with the current credentials, encrypts all data for the User with the new credentials, and sends a success/failure result to the service. The Enterprise is responsible for disposal/destruction of the decryption key upon termination of the transaction.

PC-E100 Inactive Enterprise (no activity over a period of time). This example use-case addresses the situation where an Enterprise account experiences no activity over an extended period of time. The identity service provider may run periodic batch jobs to identify Enterprises that have had no activity in <inactivity base threshold> days, or longer. Depending on the length of inactivity, the service automatically: Notifies Sales Team to initiate contact (depending on size of business), Sends notifications based on Enterprise account notification data—account is flagged as inactive, Notifies the enterprise that their account is flagged as inactive (second notice), Locks the enterprise account (expiry="never"), notifies the enterprise, Terminates any automatic payments and removes any payment methods.

OC-E110 Enterprise Shutdown/Termination (orderly, with notice). This example use-case addresses the situation where an Enterprise account is shut down based on a request from an Authorized Manager. Note that the Enterprise is not deleted from the service in order to maintain data integrity. An Authorized Manager (User) with required level of authority logs in to the service Enterprise Management service and requests to close the Enterprise account. The service then Locks the enterprise account (expiry="never"), Terminates any automatic payments, Removes any payment methods, Sends notifications that the account has been closed, Returns success (no obvious failure modes here).

OC-E140 Enterprise Verification of User Age. This example use-case addresses the situation where a user is requesting access to a service/product that is age-restricted. An example is purchasing vaping products or ammunition online. This is a prime candidate for an enterprise such as a duly constituted governing state-wide or local authority to have a mapping between the User GUID and verified actual personal information, like Date of Birth (DoB). The Enterprise may provide a service that responds to queries like "is user at least age x" with affirmative/negative (without exposing DoB or other personal information).

OC-E150 Enterprise Verification of User Registered State/County. This example use-case addresses the situation where a user is requesting access to a service/product that is location-restricted. An example is signing up for online services like schooling or local sales (e.g., Craig's List). This is a prime candidate for an enterprise such as a governing authority to have a mapping between the User GUID and verified actual personal information, such as a registered address. The Enterprise may provide a service that responds to queries like "is user in county x" with affirmative/negative (without exposing address or other personal information).

OC-B030 Payment Method Invalidation (expiry/invalidation/denied (enterprise/user). This example use-case addresses the case where a payment method is determined to be invalid. This use-case can be initiated from one of the following: Payment setup validation of new or modified payment method; Payment processing; the service periodic processing review of valid dates; the service updates the payment method status and status date; the service notifies the User/Enterprise of the status change.

OC-S010 Routine Security Operations. This example use-case addresses routine security operations. use-cases for specific types of security events are addressed in other use-cases. Security operations apply to all resources, including external-facing services, internal services, back-office operations, off-site operations (e.g., VPN connections), etc. Routine security operations may include: Certificate management; Routine updates to certificates; Deployed configuration management/verification (e.g., endpoint CM/Tripwire and whitelist management); Endpoint protection (antivirus, data loss protection); Vulnerability management (up-to-date patch levels, O/S and network device config); SIEM configuration and operation (event monitoring); Intrusion; Data breach; Host Integrity; Configuration modifications (e.g., Tripwire™ type events); Suspect User behavior (e.g., unusual login patterns); Suspect Enterprise behavior; External data flow/patterns; Internal data flow/patterns; Environment scan (scan posture, hardening, e.g., Nessus, SCAP); Red/Blue exercises; and Penetration testing.

OC-S050 Detecting Problematic User Behavior. This example use-case addresses the detection of and response to problematic User behavior. Problematic behavior may include things like failed logins or geographically unreasonable access. The detection part of this use-case is executed during Routine Security Operations, with the response detailed here.

Configure SIEM or other service (e.g., AI) to alert on patterns of User behavior that may be problematic. For example, Failed logins—series from a single source in a predefined interval, multiple "concurrent" failures from different sources. Or for example, Geographic inconsistency—attempts from geographically distributed physical instances (e.g., ATM, POS's) that are not physically reasonable.

The service may Implement a response based on User preferences. Examples include: Increase/modify strength requirement, e.g., require CAC/PIV/RSA; Suspend account for specified time; Lock account; and Notify User.

OC-S060 Detecting Problematic Enterprise Behavior (e.g., unknown IP). This example use-case addresses the detection of and response to problematic Enterprise behavior. Problematic behavior may include failed logins/authentication from an Enterprise node or geographically unreasonable access (e.g., unknown location). The detection part of this use-case is executed during Routine Security Operations, with the response detailed here.

In an example, the service configures SIEM or other service (e.g., AI) to alert on patterns of Enterprise behavior that may be problematic. For example, Failed logins—series of different Users from a single Enterprise node in a predefined interval, multiple "concurrent" failures from different nodes. Unknown IPs—attempt to access the service from an unregistered IP. Geographic inconsistency—attempts from unknown geographic locations.

The service may implement a response based on Enterprise preferences. Examples include: Increase/modify strength requirement, e.g., require CAC/PIV/RSA; Suspend account/node for specified time; Lock account/node, and Notify Enterprise (identified Users and Enterprise notification, including alternate mechanism specifically for security events such as auto voicemail).

FIG. 6 is a table 600 showing example base strength factors with context modifiers which may be implemented by the identity service provider. FIG. 7 is a table 700 showing example overlap dimensions for methods sharing a physical factor which may be implemented by the identity service provider. FIG. 8 is a table 800 showing example user preference dimensions with method ratings which may be implemented by the identity service provider. It is noted that the examples shown in FIGS. 6-8 are intended to be illustrative, and are not limiting. Other examples are also contemplated as being within the scope of the present disclosure.

In an example authentication operation, a user may authenticate at an attended teller station in a bank in order to perform a financial transaction. The user has previously established preferences with the identity service provider for a minimum Strength of 11 for Financial transactions and for selecting methods depending the least on memory (User Preference Dimension "Memory"). At the station where the user is authenticating, there are devices present that support the following authentication methods: "Password/PIN—complex", "Security pictures (3)", "CAC/PIV card (with PIN)", "Fingerprint", "Facial Recognition", "Signature recognition—dynamic write" and "Handprint".

In this example, the bank is the enterprise, and sends an authentication request to the identity service provider with the italicized parameters, plus a preferred minimum Strength of 10. The identity service provider sets minimum required strength to 11 (User preference is the maximum). The identity service provider determines a context-based strength for the available methods as follows:
Password/PIN—complex: 5
Security pictures (3): 4
CAC/PIV card (with PIN): 8
Fingerprint: 6=4 (Base Strength)+2 (Attended Context)
Facial recognition: 8=6 (Base Strength)+2 (Attended Context)
Signature recognition—dynamic: 8=6 (Base Strength)+2 (Attended Context)
Handprint: 7=6 (Base Strength)+1 (Attended Context)
The identity service provider orders the available methods by increasing dependence on memory, as follows:
Fingerprint: 0
Facial recognition: 0
Handprint: 0
CAC/PIV card (with PIN): 1
Signature recognition—dynamic: 1
Security pictures (3): 3
Password/PIN—complex: 5
The identity service provider then applies overlap factors to determine a strength for the available methods. The SmartDevice overlap is not applied due to Attended Context. Of the Fingerprint, Handprint and "Signature recognition and dynamic" overlap in the Bio-Hand dimension (hand biometry), Handprint has an overlap factor of 0.8 applied, giving Handprint (first overlap) Strength=7*0.8=5.6 and Signature recognition—dynamic (second overlap) Strength=8*0.8^2=5.12.

The identity service provider then goes through the ordered list, summing the strength until the required strength (11) is met, as follows:
Fingerprint: 6
Facial recognition: 8
Handprint: 5.6
CAC/PIV card (with PIN): 8
Signature recognition—dynamic: 5.12
Security pictures (3): 4
Password/PIN—complex: 5
The sum of the strengths for the first two methods achieves the required strength (6+8=14>=11). The identity service provider then checks to see if the minimum Strength can be achieved with a subset of the selected methods. If, for example, "Security pictures (3)" had been the second in order, ("Fingerprint", "Security pictures (3)" and then "Facial recognition"), then "Fingerprint" may have been removed, as "Security pictures (3)" and "Facial recognition" may have met the desired strength of 11. The identity service provider then requests credentials for the final selected methods (Fingerprint and Facial recognition) and proceeds with authenticating the User based on the User credentials for the selected methods.

In an example, the example operations allow a user to provide alternate credentials to signal to the service that an authentication transaction is being performed under duress.

It is noted that the examples shown and described are provided for purposes of illustration and are not intended to be limiting. Still other examples are also contemplated.

The invention claimed is:

1. A method of multifactor authentication incorporating user preferences and enterprise preferences, comprising:
receiving by an identity service provider computer system a request from an enterprise computer system for authentication of a user to access a resource of the enterprise;
requesting by the identity service provider computer system, available authentication at a point of authentication for the user;
determining by the identity service provider computer system a set of authentication credentials to apply based on any combination of: context, the available authentication at the point of authentication, the user preferences, and the enterprise preferences;
requesting by the identity service provider computer system, the set of authentication credentials from the point of authentication for the user;
receiving by the identity service provider computer system, the requested set of authentication credentials from the point of authentication;
authenticating the user by the identity service provider computer system based on the received set of authentication credentials from the point of authentication;
providing the user authenticated identity for use by the enterprise to provide or deny access to the resources of the enterprise; and
determining by the identity service provider computer system a combination of authentication methods to apply based on techniques available to a service at any given time, wherein selection of techniques is based on a canonical strength calculation to determine which set of available methods meets user and enterprise criteria.

2. The method of claim 1, wherein incorporation of user preferences during the authentication provides the user influence in determining an intensity with which authentication barriers are presented.

3. The method of claim 1, wherein incorporation of enterprise preferences during the authentication provides the enterprise influence in determining an intensity with which authentication barriers are presented.

4. The method of claim 1, further comprising enabling a mix of authentication factors so that a number and type of authentication factors vary, even for the same user authenticating to the same context.

5. The method of claim 4, wherein the mix of authentication factors reduces potency of overlapping authentication factors.

6. The method of claim 1, wherein attributes of the authentication context are utilized to modify the strength of one or more authentication methods.

7. The method of claim 1, further comprising providing a service for the user to manage credential information securely and eliminate individual asset custodians so that a user can manage the credential information altogether in one place.

8. The method of claim 1, further comprising maintaining a user data encryption token by the service or another third party outside of the enterprise computer system for additional authentication.

9. The method of claim 1, further comprising providing a global authentication service that provides unique user authentication from a central source.

10. The method of claim 1, wherein the identity service provider computer system determines the set of authentication credentials to apply from all available authentication credentials at any given time.

11. The method of claim 1, wherein determining the set of authentication credentials is based on available authentication credentials at the point of authentication.

12. The method of claim 1, wherein determining the set of authentication credentials is based on user credentials known to the service.

13. The method of claim 1, wherein the strength for a collection of authentication factors from which the set of authentication credentials is determined is based on a nominal strength for each factor.

14. The method of claim 13, wherein candidate parameters for the collection of authentication factors include co-dependence on a single object that may be compromised and/or environment in which a transaction is being performed.

15. The method of claim 1, further comprising preferring or prohibiting a particular authentication credential when multiple sets of authentication credentials meet a required strength for the authentication credential.

16. A multifactor authentication system incorporating user preferences and enterprise preferences, comprising:
a point of authentication for a user, the point of authentication having available authentication credentials for the user;
an identity service provider computer system configured to receive a request from an enterprise computer system for authentication of the user to access a resource of the enterprise;
a set of authentication credentials determined by the identity service provider computer system to apply based on a combination of a canonical authentication strength calculation to determine which set of available methods meets user and enterprise criteria, and at least one of context, the available authentication credentials at the point of authentication, the user preferences, and the enterprise preferences;
wherein the identity service provider computer system receives the set of authentication credentials from the point of authentication to authenticate the user based on the authentication credentials received from the point of authentication; and
wherein the identity service provider computer system approves the user for access to the resource of the enterprise after authenticating the user.

17. The system of claim 16, wherein the canonical authentication strength provides a common expression for an expected confidence in an identity of the user, and the canonical authentication strength is produced by an arbitrary combination of authentication methods.

18. The method of claim 1, wherein the canonical strength permits users and enterprises to express requirements for a level of confidence that a user is who the user claims to be for a given circumstance.

19. The method of claim 18, wherein the canonical strength for a collection of authentication factors is based on a nominal strength for each factor.

20. The method of claim 19, wherein the canonical strength is adjustable based on factors that impact viability of the authentication methods under one or more circumstances.

* * * * *